US012811146B2

(12) United States Patent
Sridhar et al.

(10) Patent No.: US 12,811,146 B2
(45) Date of Patent: Nov. 24, 2026

(54) METHOD OF PREVENTING SHEDDING OF ACTIVATED CARBON WHEN UTILIZED IN BATTERY ELECTRODE

(71) Applicant: Mesha Energy Solutions Pvt Ltd, Bangalore (IN)

(72) Inventors: P. Sridhar, Bangalore (IN); K L Sachin, Bangalore (IN)

(73) Assignee: SGSS ENERGY PRIVATE LIMITED, Bangalore South (IN)

( * ) Notice: Subject to any disclaimer, the term of this patent is extended or adjusted under 35 U.S.C. 154(b) by 597 days.

(21) Appl. No.: 18/236,718

(22) Filed: Aug. 22, 2023

(65) Prior Publication Data

US 2024/0322166 A1 Sep. 26, 2024

(30) Foreign Application Priority Data

Mar. 26, 2023 (IN) ............................. 202341021584

(51) Int. Cl.

*H01M 4/583* (2010.01)
*C01B 32/384* (2017.01)
*H01M 4/02* (2006.01)
*H01M 4/62* (2006.01)

(52) U.S. Cl.

CPC ........... *H01M 4/583* (2013.01); *C01B 32/384* (2017.08); *H01M 4/622* (2013.01); *H01M 4/623* (2013.01); *C01P 2004/61* (2013.01); *C01P 2006/40* (2013.01); *H01M 2004/021* (2013.01)

(58) Field of Classification Search

CPC ...... H01M 4/583; H01M 4/622; H01M 4/623; H01M 2004/021; C01B 32/384; C01B 32/30; C01B 32/306; C01B 32/312; C01B 32/318; C01B 32/324; C01B 32/33; C01B 32/336; C01B 32/342; C01B 32/348; C01B 32/354; C01B 32/36; C01B 32/366; C01B 32/372; C01B 32/378; C01B 32/382; C01B 32/39; C01P 2004/61; C01P 2006/40

See application file for complete search history.

(56) References Cited

U.S. PATENT DOCUMENTS

| | | | | | |
|---|---|---|---|---|---|
| 5,482,773 | A * | 1/1996 | Bair | B01J 20/20 | 428/367 |
| 6,046,268 | A * | 4/2000 | Ochoa | H01M 4/13 | 429/231.95 |

FOREIGN PATENT DOCUMENTS

| | | | | |
|---|---|---|---|---|
| EP | 3968417 | * | 3/2022 | H01M 4/62 |

OTHER PUBLICATIONS

Definition of shed, accessed online at https://www.merriam-webster.com/dictionary/shedding on Mar. 5, 2026 (Year: 2026).*

Bonnefoi, et al., Electrode compositions for carbon power supercapacitors, Journal of Power Sources 1999; 80: 149-155 (Year: 1999).*

Noked, et al., The electrochemistry of activated carbonaceous materials: past, present, and future, J Solid State Electrochem 2011; 15: 1563-1578 (Year: 2011).*

Ruiz, et al., Effect of the thermal treatment of carbon-based electrodes on the electrochemical performance of supercapacitors, Journal of Electroanalytical Chemistry 2018; 618: 17-23 (Year: 2018).*

* cited by examiner

*Primary Examiner* — Daniel C. Mccracken
(74) *Attorney, Agent, or Firm* — Procopio, Cory, Hargreaves & Savitch LLP

(57) ABSTRACT

The present invention discloses a method for preventing shedding of activated carbon (108) when utilized in battery electrode, the method comprises dissolving at least one binder (102) with a solvent (104) to form a solution (106). A slurry (110) is prepared by adding activated carbon (108) to the formed solution (106). The solvent (104) is evaporated by drying the slurry (110). The dried slurry is heated to a predefined temperature for a predefined duration to bind the activated carbon (108) particles together and reduce shedding during usage of activated carbon in battery electrode. The dried slurry is further heated to the predefined temperature higher than what is used for binding activated carbon particles together for a further predefined duration to remove unwanted functional groups leading to parasitic reaction. Thereafter, the processed bonded activated carbon (112) is collected to be used in the battery electrode.

8 Claims, 7 Drawing Sheets

METHOD OF PREVENTING SHEDDING OF ACTIVATED CARBON WHEN UTILIZED IN BATTERY ELECTRODE

FIELD OF INVENTION

The field of invention generally relates to alkali batteries and alkali ion batteries. More specifically, it relates to a method of usage in enhancing the charge-discharge rate and preventing shedding of activated carbon when utilized in battery electrode.

BACKGROUND

For a sustainable energy economy, it is important to keep in mind that the batteries being used should be effective, affordable, and environmentally friendly.

Currently, existing systems do not succeed in providing efficient method of preventing shedding of activated carbon when utilized in electrodes of a battery. When the charging capacity is maintained above certain limit, a decrease in discharge capacity is seen after numerous charging-discharging cycles. The primary cause is due to recurrent blockage and ionic species from relatively large molecules breaking carbon particles on the electrode that leads to shedding of activated carbon.

While battery efficiency is an important factor, cycle life also has a significant impact on how well a battery performs. Other existing systems have tried to address this problem. However, there are no systems and methods using binder to hold the activated carbon particles to prevent shedding of processed activated carbon during usage of the same in the electrode. The usage of binder is limited to introducing hydrophobicity. Further, in the lithium-ion batteries, lithium ions commonly bond with unwanted functional groups of the carbon leading to the parasitic reaction when utilized in the electrode. However, there are no systems and method for removal of the unwanted functional groups, which hinder the capacity of the battery.

Thus, in light of the above discussion, it is implied that there is a need for a system and method for reliable and efficient utilization of electrodes in the battery and does not suffer from the problems discussed above.

OBJECT OF INVENTION

The principal object of this invention is to provide a method of preventing shedding of the high surface area activated carbon when utilized in the battery electrode. When activated carbon is referenced from it refers to high surface area activated carbon.

A further object of the invention is to provide a method for processing the activated carbon by thermal treatment for removal of the functional groups that causes parasitic reactions reducing the energy capacity of the battery.

Another object of the invention is to provide a method for processing the carbon to improve the electrical conductivity at much lower temperature.

Another object of the invention is to enhance the performance of the electrode utilized in the battery using a binder to hold the processed activated carbon.

BRIEF DESCRIPTION OF FIGURES

This invention is illustrated in the accompanying drawings, throughout which, like reference letters indicate corresponding parts in the various figures.

The embodiments herein will be better understood from the following description with reference to the drawings, in which.

STATEMENT OF INVENTION

Figure 1:
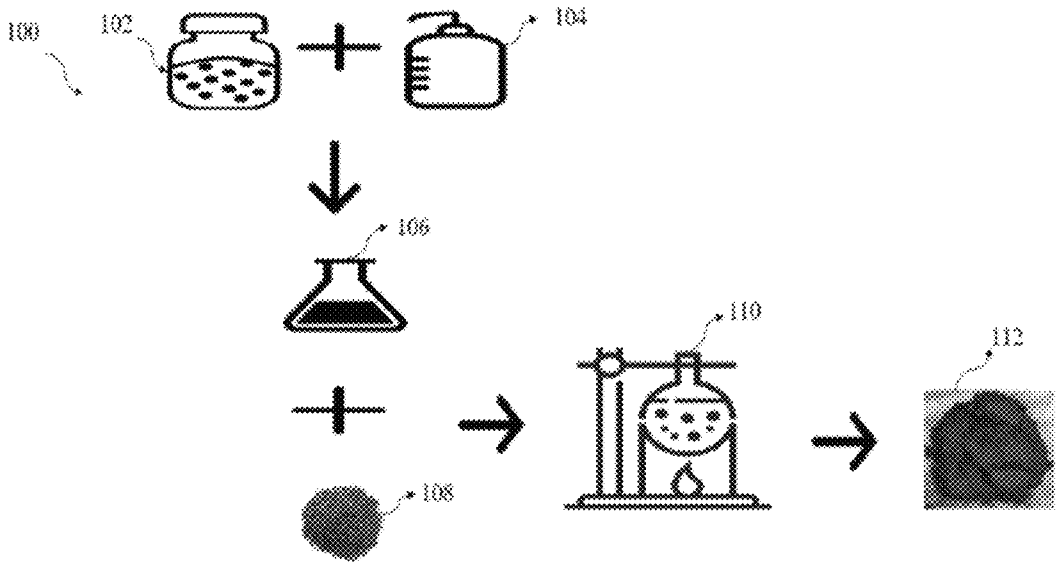
FIG. 1 depicts a process flow diagram of processing activated carbon, in accordance with an embodiment of the invention.

The present invention discloses a method for preventing shedding of activated carbon when utilized in battery electrode. The method comprises dissolving at least one binder chosen from a group consisting of Polytetrafluoroethylene (PTFE), Polyvinylidene Difluoride (PVDF) and Sodium Carboxymethyl Cellulose (CMC) with a solvent to form a solution.

The method comprises dissolving at least one binder chosen from a group consisting of Polytetrafluoroethylene (PTFE), Polyvinylidene Difluoride (PVDF) and Sodium Carboxymethyl Cellulose (CMC) with a solvent to form a solution. Furthermore, the method comprises preparing a slurry by adding activated carbon to the formed solution. Furthermore, the method comprises evaporating the solvent by drying the slurry. Furthermore, the method discloses heating the dried slurry to a predefined temperature for a predefined duration to bind the activated carbon particles together and reduce shedding during usage of activated carbon in battery electrode.

Furthermore, the method discloses further heating the dried slurry to the predefined temperature higher than what is used for binding activated carbon particles together for a further predefined duration to remove unwanted functional groups leading to parasitic reaction. Thereafter, the method discloses collecting the processed bonded activated carbon to be used in the battery electrode.

The battery electrode processed by the bonded activated carbon increased performance of the battery.

DETAILED DESCRIPTION

The embodiments herein and the various features and advantageous details thereof are explained more fully with reference to the non-limiting embodiments that are illustrated in the accompanying drawings and/or detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present invention discloses a method of enhancing the charge-discharge rate and preventing shedding of activated carbon when utilized in battery electrode. The activated carbon is processed and prepared by exposing the binder for thermal treatment. This treated processed carbon is used in constructing an electrode and improving the efficacy of an electrochemical cell.

In the context of the present invention, an electrochemical cell may be any electrochemical cell commonly known in the art such as a lead-acid battery, sodium-ion battery or a lithium battery or any other electrochemical cells. The electrode may be at least one of a cathode or an anode.

Throughout this description, preventing shedding of the activated carbon when utilized in the battery electrode has been explained with the help of an illustrative process. This embodiment should not be read as a limitation of this invention and the scope of this description covers other embodiments like graphene, carbon nanotubes such as single wall, multiwall wherein the disclosed method of preventing shedding of the activated carbon may be utilized. Referring now to the drawings, where similar reference characters denote corresponding features consistently throughout the figures, there are shown preferred embodiments.

FIG. 1 depicts a process flow diagram of processing a bonded activated carbon 112, in accordance with an embodiment of the invention:

In this method, a binder 102 may be selected from at least one of Polytetrafluoroethylene (PTFE), Polyvinylidene Difluoride (PVDF) and Sodium Carboxymethyl Cellulose (CMC). The binder 102 is mixed with a solvent 104 to form a solution 106. The solvent 104 may be at least one of but not limited to distilled water, dimethylformamide (DMF), N-methyl-2-pyrrolidone (NMP). A crucial role of a polymeric binder is that the polymeric binder provides a strong adhesion and cohesion between active and conductive materials thereby resulting in stronger interfaces and enhanced performance, stable, low-resistance bonding, particle-to-particle contact, and provides mechanical integrity to the electrode. The binder 102 is added incrementally while the solvent 104 is being stirred. The solvent 104 with the binder 102 is then utilized for slurry 110 preparation after the binder 102 has been fully dissolved. It is necessary to ensure that the binder 102 does not affect the conductive nature of the carbon.

A slurry 110 is formed by adding the activated carbon 108 to the prepared solution 106. The activated carbon 108 may be derived from any carbon source but not limited to, bamboo, coconut husk, willow peat, wood, coir, lignite, coal, and petroleum pitch. The activated carbon 108 may be formed by using the physical reactivation techniques or chemical reactivation techniques. In an embodiment, any other different techniques may be involved for preparing the activated carbon 108.

The activated carbon 108 is added in stages to the binder 102 dissolved solvent 106 with the continuous stirring of the solvent 104 to form the slurry 110. Upon formation of the slurry 110, the solvent 104 is evaporated by controlled heating and continuous stirring. The slurry 110 is dried in order to deprive the slurry 110 of all moisture to form a dry powder. Further, the dried slurry 110 is heated to a predefined temperature for a predefined duration to bind the activated carbon particles together and reduce shedding during usage of activated carbon 108 in battery electrode. The dried slurry is heated to the temperature in the range of 100° C.-400° C. for the duration of 5-60 minutes to bind the activated carbon particles together and reduce shedding during usage of activated carbon 108 in battery electrode.

Furthermore, the dried slurry 110 is heated to the predefined temperature for the predefined duration for removal of unwanted functional groups leading to parasitic reaction such that the temperature is higher than what is used for binding the activated carbon particles together. The dried slurry 110 is further heated to a temperature in the range of 250° C.-400° C. for a duration of 1 to 5 hours for removal of unwanted functional groups leading to parasitic reaction such that the temperature is higher than what is used for binding the activated carbon particles together.

Further, the dry powder is processed to reduce the bonded activated carbon 112 to the one or more-micron level particles based on the desired application using a micronizer. The processing of bonded activated carbon 112 comprises reducing the bonded activated carbon 112 into smaller particles using a crusher system and processing the smaller particles to the one or more-micron levels.

The bonded activated carbon 112 can be reduced to one or more-micron levels ranging from 10 to 45 microns. The desired micron level may be used on the required application. The bonded activated carbon 112 with lower micron sizes can provide some advantages over larger micron sizes, especially when used as an electrode material in batteries. The smaller particle size allows for better integration of the activated carbon with the battery material, which can improve the performance and stability of the battery. However, the choice of activated carbon particle size is ultimately determined by cost and application. In some cases, larger particle sizes may be more cost-effective or suitable for a specific application, while in others, smaller particle sizes may provide better performance and justify the additional cost.

In an exemplary embodiment of the invention, PTFE is selected as the binder 102 and dissolved with distilled water as the solvent 104 to form a solution 106. Further, the distilled water is heated to a temperature ranging from 50° C.-80° C. and is continuously stirred using a stirrer at high RPM. Further, the slurry 110 is heated to the temperature ranging 300° C.-400° C. for the duration ranging between 5 and 60 minutes. The processed bonded activated carbon 112 to be used in the battery electrode is collected. An advantage of processing the bonded activated carbon 112 is that the reduced dry powder into the one or more-micron level particles that can be used for various applications by further reducing the dry powder into the required one or more-micron levels.

Figure 2:
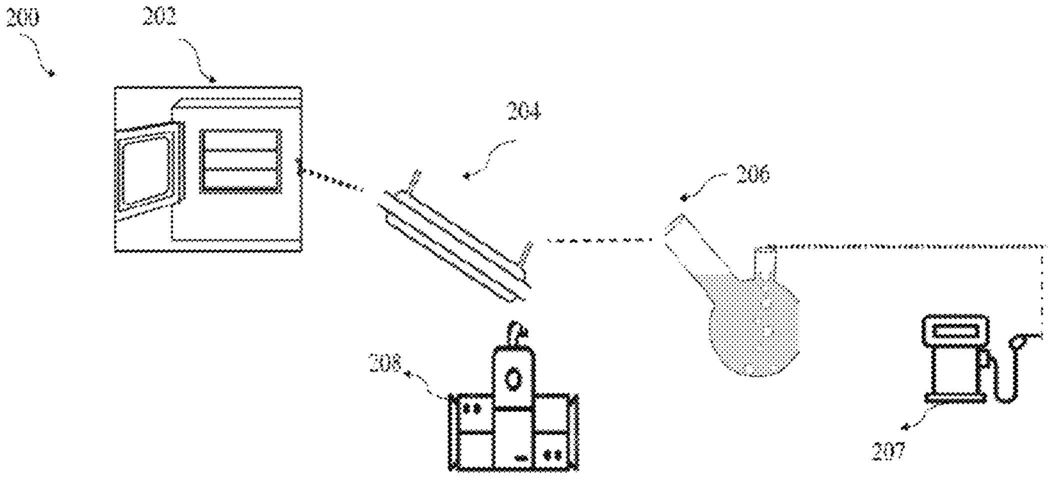
FIG. 2 illustrates a method of evaporating the solvent from the prepared slurry, in accordance with an embodiment of the invention.

FIG. 2 illustrates a method of evaporating the solvent 104 from the prepared slurry 110, in accordance with an embodiment of the invention:

In a preferred embodiment, a vacuum oven 202 is preheated to the temperature ranging 150° C.-200° C. Further, the prepared slurry 110 is poured into the tray (not shown) and placed inside the vacuum oven 202. The structure of the vacuum oven 202 includes an output that connects it to a number of condensers 204. Additionally, the final condenser

204, which captures any remaining solvent 104 vapor that the condensers are unable to condense, is coupled to a trap 206. For the purpose of removing the solvent 104 vapor from the vacuum oven, a vacuum pump 207 is connected to the trap 206. A chiller 208 and a pump 207 are used to circulate the coolant through the condensers and cool them to the temperature of 10° C. The vacuum oven 202, the vacuum pump 207, the number of condensers 204, and the chiller 208 were sized in a preferred form to maximize solvent 104 recovery and scale up the production of the bonded carbon.

Figure 3:
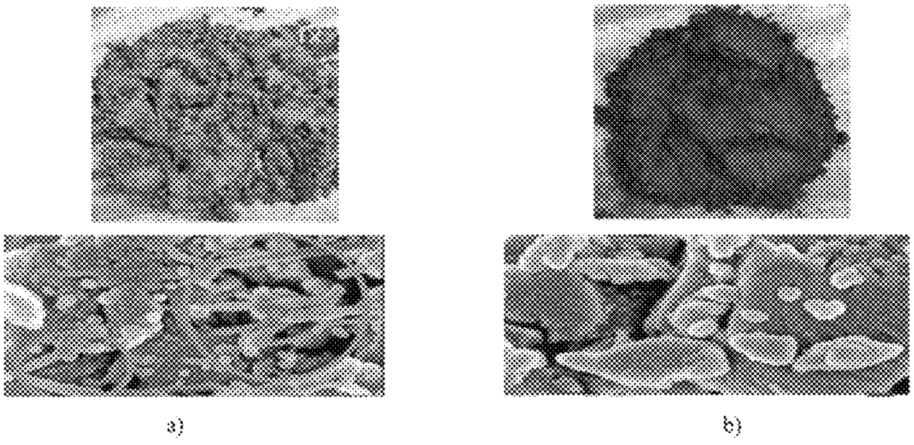
FIG. 3 depicts comparative images of the PTFE binder treated at different temperatures for preparing the processed activated carbon for electrode, in accordance with an embodiment of the invention.

FIG. 3 depicts comparative images of the PTFE treated at different temperatures for preparing the processed activated carbon for electrode, in accordance with an embodiment of the invention:

In an embodiment, FIG. 3*a* illustrates, when PTFE as the binder 102 is treated at temperature 100° C. as increased surface area without proper bonding of activated carbon 108 which leads to shedding of activated carbon 108 and decreases the conductivity of the battery. FIG. 3*b* illustrates when PTFE as the binder 102 is treated at temperature 350° C., the image clearly depicts the proper binding of carbon structures with fine capsule structures whereas the FIG. 3*a* does not disclose fine binding of carbon particles. The fibrous structures depicted in the FIG. 3*a* is removed by further heating the activated carbon to the higher temperature.

Figure 4:
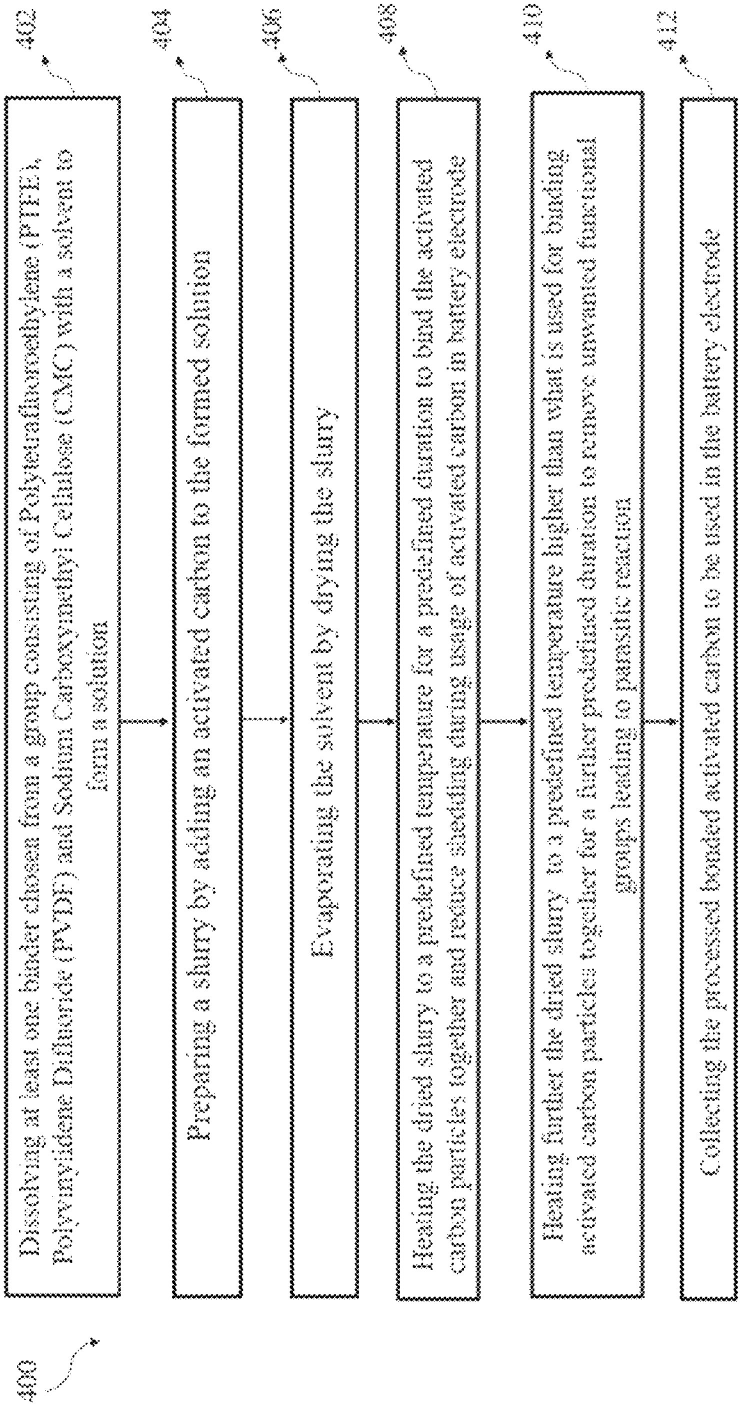
FIG. 4 illustrates a method of preventing shedding of activated carbon when utilized in battery electrode, in accordance with an embodiment of the invention.

FIG. 4 illustrates a method of preventing shedding of activated carbon 108 when utilized in the battery electrode, in accordance with an embodiment of the invention:

Initially, at step 402, at least one binder 102 chosen from a group consisting of Polytetrafluoroethylene (PTFE), Polyvinylidene Difluoride (PVDF) and Sodium Carboxymethyl Cellulose (CMC) with a solvent 104 is dissolved to form a solution 106.

Furthermore, the slurry 110 is prepared by adding an activated carbon 108 to the formed solution 106, as depicted in step 404.

Furthermore, the solvent 104 is evaporated by drying the slurry 110, as depicted in step 406.

Furthermore, the dried slurry 110 is heated to a predefined temperature for a predefined duration to bind the activated carbon 108 particles together and reduce shedding during usage of activated carbon 108 in battery electrode, as depicted in step 408.

Furthermore, further heating the dried slurry 110 to a predefined temperature higher than what is used for binding activated carbon 108 particles together for a further predefined duration to remove unwanted functional groups leading to parasitic reaction, as depicted in step 410.

Thereafter, the processed bonded activated carbon 112 to be used in the battery electrode, as depicted in step 412. The processed bonded activated carbon 112 is obtained in dry powder form with the one or more-micron levels based on required applications.

In an embodiment, the processed bonded activated carbon 112 may be mixed with electrode material while constructing an electrode to prevent the shedding of activated carbon 108 when utilized in battery.

Figure 5:
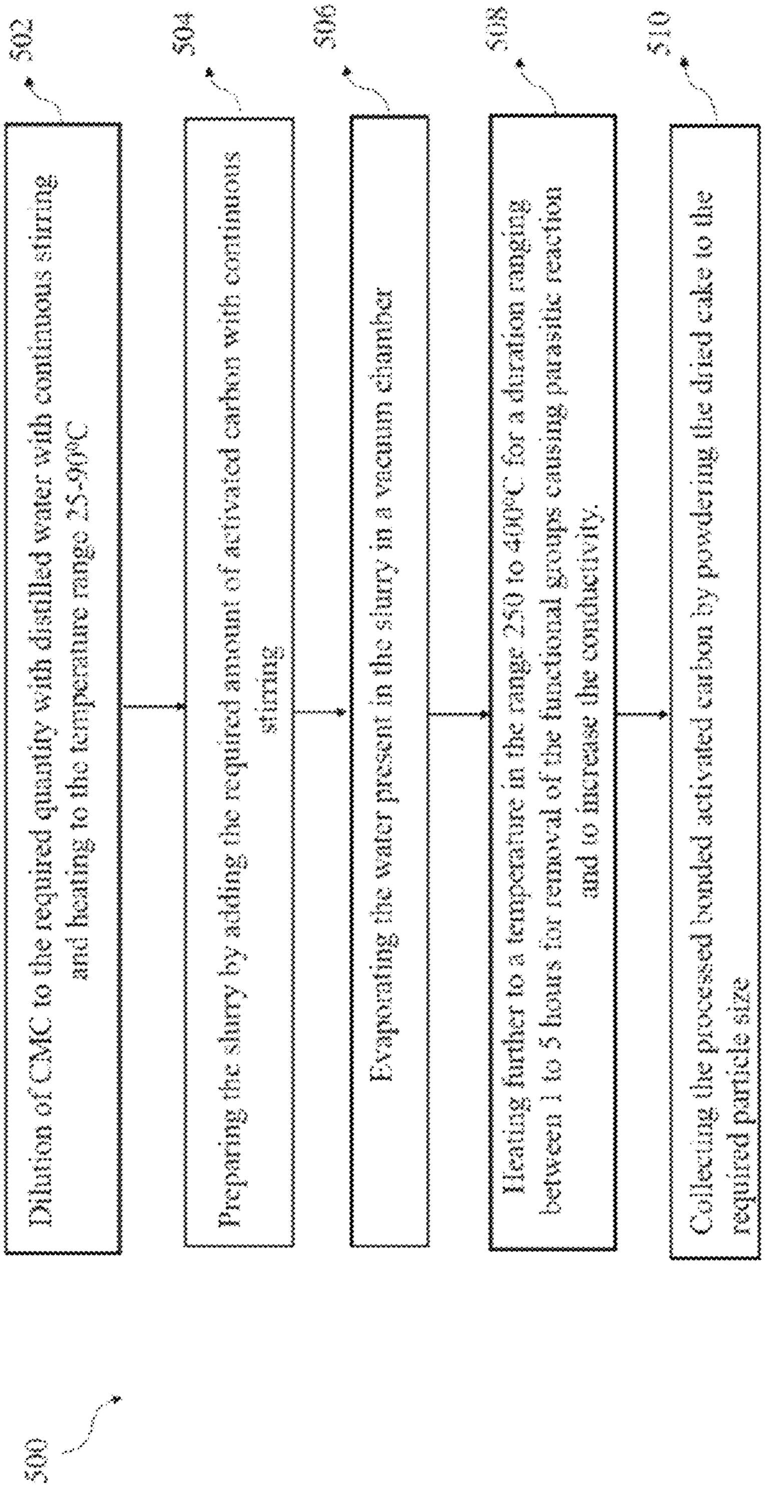
FIG. 5 illustrates a process of preparing the processed activated carbon with Sodium Carboxymethyl Cellulose (CMC) as a binder for anode electrode of Lithium-ion battery, in accordance with an embodiment of the invention.

FIG. 5 illustrates a process of preparing the processed activated carbon 108 with Sodium Carboxymethyl Cellulose (CMC) as a binder 102 for anode electrode of Lithium-ion battery, in accordance with an embodiment of the invention.

In the current invention, at step 502, CMC binder 102 is dissolved to the required quantity with distilled water with continuous stirring and heating to the temperature range 20° C.-90° C.

Further, the slurry 110 is prepared by adding the required amount of activated carbon 108 with continuous stirring, as depicted in step 504.

Further, the water present in the slurry 110 is evaporated in a vacuum chamber, as depicted in step 506.

Further, the dried slurry 110 is further heated to a temperature in the range 250° C.-400° C. for a duration ranging between 1 to 5 hours for removal of the functional groups causing parasitic reaction and to increase the conductivity, as depicted in step 508. The person skilled in the art will recognize the functional group as an atom or group of atoms within a molecule that has similar chemical properties whenever it appears in various compounds. However, there may be certain group of unwanted atoms that bind with other/different group of atoms leading to certain chemical reactions. Functional groups may be alkyl, alkenyl, alkynyl, carbonyl, carboxyl and the like. For example, in the lithium-ion batteries, lithium ions commonly bond with unwanted functional groups of the carbon leading to the parasitic reaction when utilized in the electrode. Thus, by further heating to the predetermined temperature and the predefined duration increases the conductivity of the activated carbon by removing of the functional groups causing parasitic reaction.

Finally, the processed bonded activated carbon 112 is collected by powdering the dried cake to the required particle size, as depicted in step 510.

Figure 6:
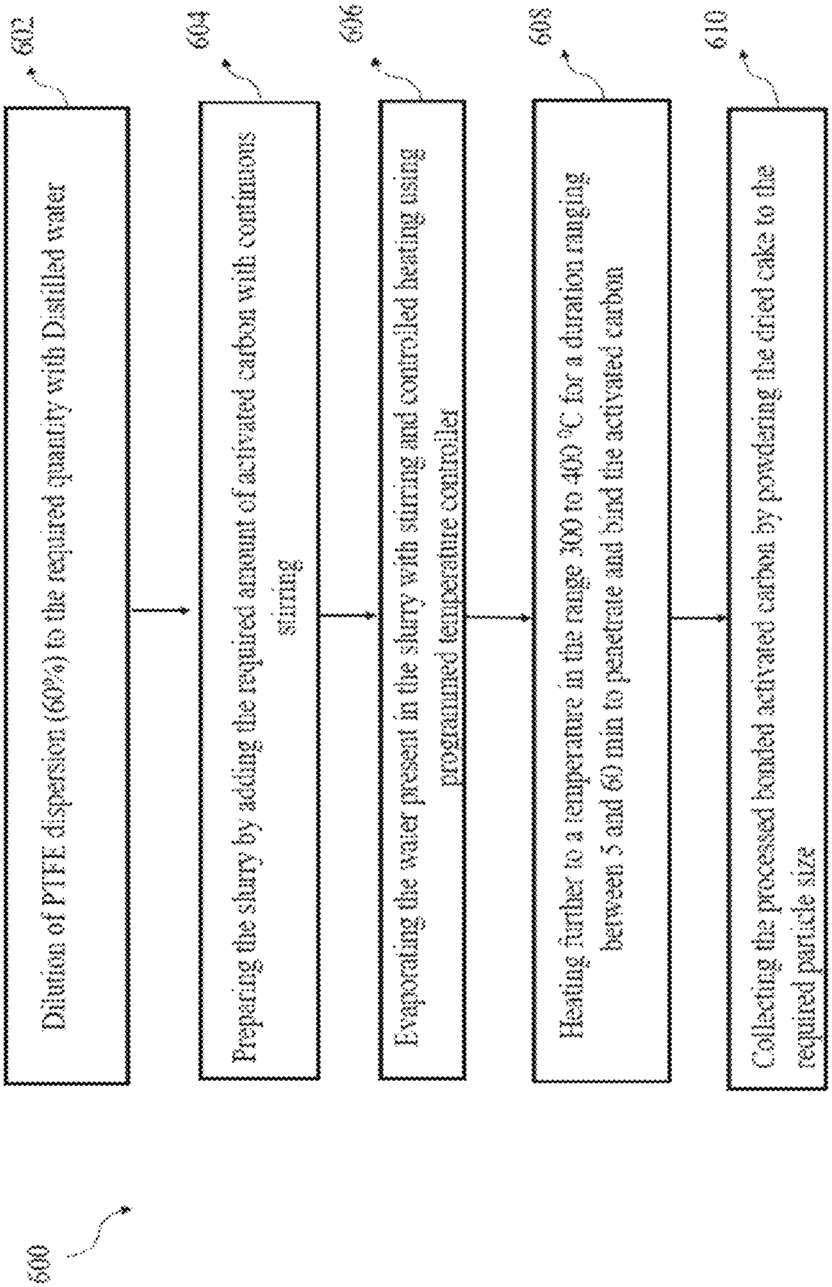
FIG. 6 illustrates a method of preparing the processed activated carbon with Polytetrafluoroethylene (PTFE) as a binder for anode electrode of Lithium-ion battery, in accordance with an embodiment of the invention.

FIG. 6 illustrates a method of preparing the processed activated carbon 108 with Polytetrafluoroethylene (PTFE) as a binder 102 for anode electrode of Lithium-ion battery, in accordance with an embodiment of the invention.

Initially, the PTFE dispersion of the required quantity is dissolved with distilled water, as depicted in step 602.

Further, the slurry 110 is prepared by adding the required amount of activated carbon 108 with continuous stirring, as depicted in step 604.

Further, the water present in the slurry 110 is evaporated with continuous stirring and controlled heating using programmed temperature controller, as depicted in step 606.

Further, the slurry 110 is heated to a temperature in the range 300° C. to 400° C. for a duration ranging between 5 and 60 minutes to penetrate and bind the activated carbon 108, as depicted in step 608.

Thereafter, the processed bonded activated carbon 112 is collected by powdering the dried cake to the required particle size, as depicted in step 610.

Figure 7:
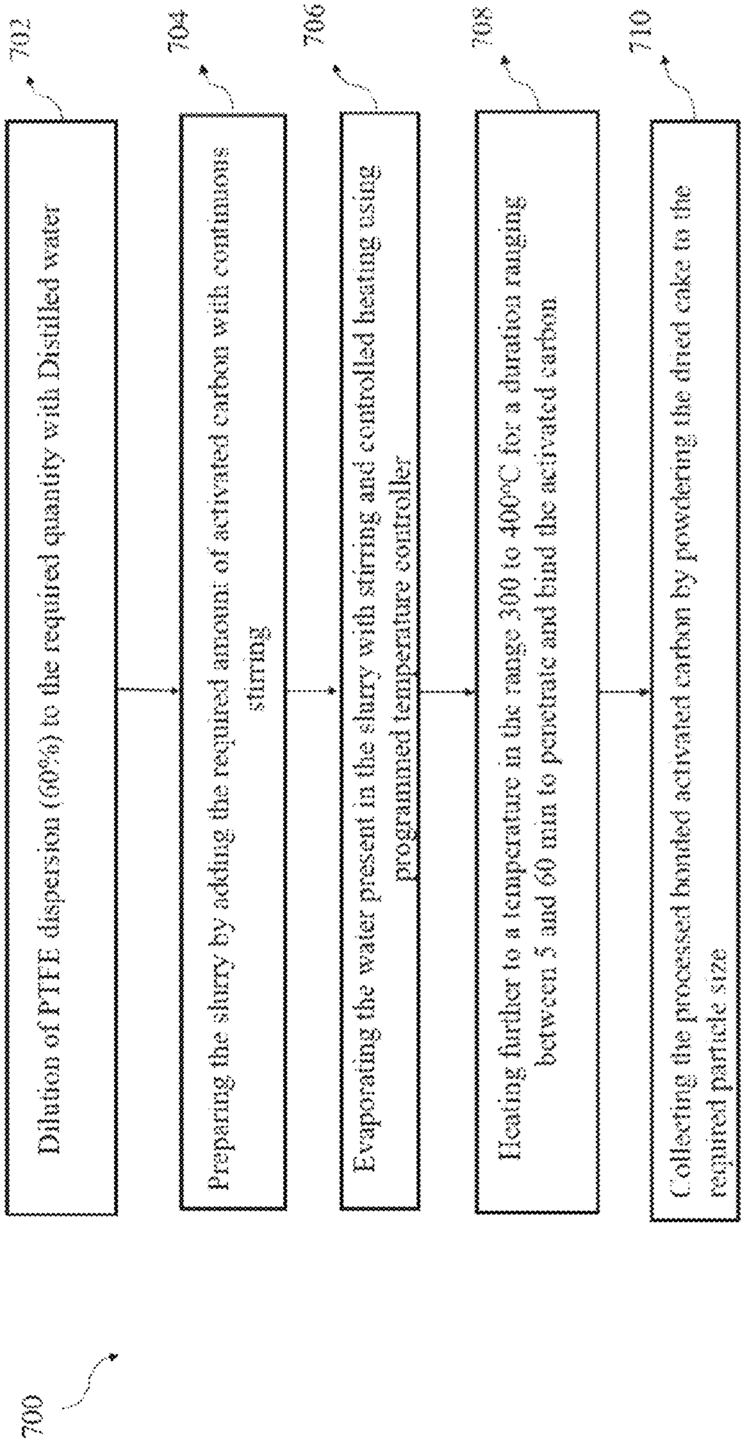
FIG. 7 illustrates a method of preparing the processed activated carbon with Polytetrafluoroethylene (PTFE) as a binder for negative electrode of Lead acid battery, in accordance with an embodiment of the invention.

FIG. 7 illustrates a method of preparing the processed activated carbon with Polytetrafluoroethylene (PTFE) as a binder for negative electrode of Lead acid battery, in accordance with an embodiment of the invention:

Initially, the PTFE dispersion of 60 wt. % of the required quantity is dissolved with distilled water, as depicted in step 702.

Further, the slurry 110 is prepared by adding the required amount of activated carbon 108 with continuous stirring, as depicted in step 704.

Further, the water present in the slurry 110 is evaporated with continuous stirring and controlled heating using programmed temperature controller, as depicted in step 706.

Further, the slurry 110 is heated to a temperature in the range 300° C. to 400° C. for a duration ranging between 5 and 60 minutes to penetrate and bind the activated carbon 108, as depicted in step 708.

Figure 8:
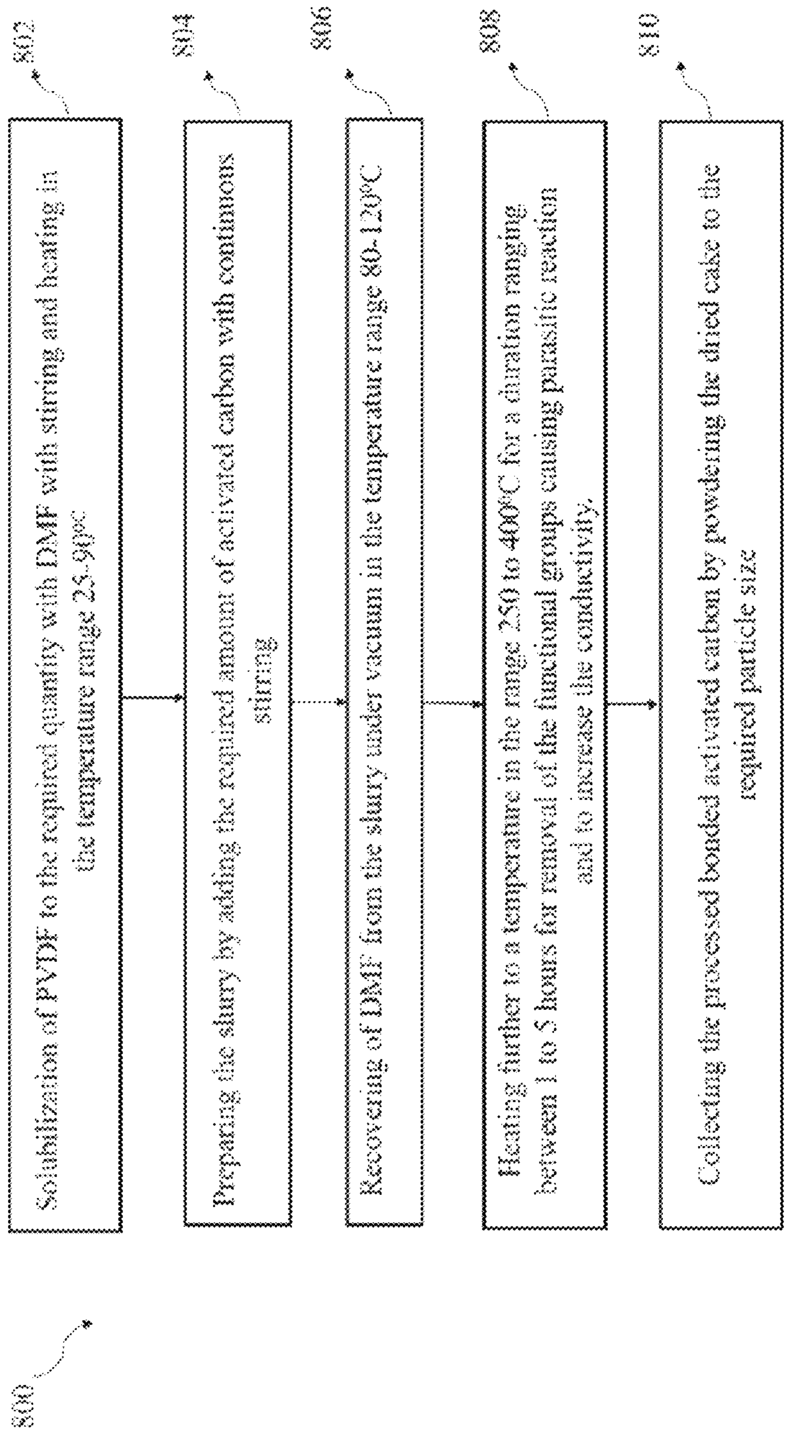
FIG. 8 illustrates a method of preparing the processed activated carbon with Polyvinylidene Difluoride (PVDF) as a binder for cathode electrode of Lithium-ion battery, in accordance with an embodiment of the invention.

FIG. 8 illustrates a method of preparing the processed activated carbon 108 with Polyvinylidene Difluoride (PVDF) as a binder 102 for cathode electrode of Lithium-ion battery, in accordance with an embodiment of the invention.

According to the present invention, the PVDF to the required quantity is solubilized with DMF with continuous stirring and heating in the temperature range 25° C.-90° C., as depicted in step 802.

Further, the slurry 110 is prepared by adding the required amount of activated carbon 108 with continuous stirring, as depicted in step 804.

Further, the DMF used as solvent 104 is recovered from the slurry 110 under vacuum in the temperature range 80° C.-120° C., as depicted in step 806.

Further, heating further to a temperature in the range 250° C. to 400° C. for a duration ranging between 1 and 5 hours for removal of the functional groups causing, as depicted in step 808.

Finally, the processed bonded activated carbon 112 is collected by powdering the dried cake to the required particle size, as depicted in step 810.

The advantages of the current invention include by binding the activated carbon 108 when utilized in the electrode increases the battery performance.

Further, by exposing the binder for further thermal treatment after removal of solvent 104 from the slurry 110 aids in binding the activated carbon 108 thereby preventing the shedding of activated carbon 108 when utilized in the electrode.

Further, by exposing the processed activated carbon for further thermal treatment after removal of solvent 104 from the slurry 110 aids in removal of the unwanted functional groups causing parasitic reaction and increases the conductivity of the processed activated carbon.

An additional advantage is that the processed bonded activated carbon enhances the charge-discharge rate of the battery.

An additional advantage is that the processed bonded activated carbon offers compact mechanical strength in the electrode.

Applications of the current invention include Electric Vehicles (EVs), power backups, laptops, mobiles and the like.

Additional benefits of the processed bonded activated carbon for electrodes are that it is easier to produce and less expensive. Moreover, incorporation of such a battery system does not require structural changes, thereby increasing simplicity of the system and is cost-effective.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described here.

The invention claimed is:

1. A method for reducing shedding of activated carbon (108) for use in a battery electrode, the method comprising:

dissolving at least one binder (102) chosen from a group consisting of Polytetrafluoroethylene (PTFE), Polyvinylidene Difluoride (PVDF) and Sodium Carboxymethyl Cellulose (CMC) with a solvent (104) to form a solution (106);

preparing a slurry (110) by adding the activated carbon (108) to the formed solution (106);

evaporating the solvent (104) by drying the slurry (110);

heating the dried slurry (110) to a predefined temperature for a predefined duration to bind activated carbon particles together and reduce shedding during usage of the activated carbon (108) in a battery electrode;

further heating the dried slurry (110) to a predefined temperature higher than what is used for binding the activated carbon particles together for a further predefined duration to remove unwanted functional groups leading to a parasitic reaction; and collecting processed bonded activated carbon (112) for use in the battery electrode.

2. The method as claimed in claim 1, wherein the dried slurry (110) is heated to a temperature in a range of 100° C.-400° C. for the duration of 5-60 minutes to bind the activated carbon particles together and reduce shedding during usage of the activated carbon (108) in a battery electrode.

3. The method as claimed in claim 1, wherein the dried slurry (110) is further heated to a temperature in a range of 250° C.-400° C. for a duration of 1 hour to 5 hours for removal of unwanted functional groups leading to a parasitic reaction such that the temperature is higher than what is used for binding the activated carbon particles together.

4. The method as claimed in claim 1, wherein forming the solution (106) comprises:

heating the solvent (104) in a range of 50° C.-80° C.; and adding the at least one binder (102) to the heated solvent (104) by continuous stirring.

5. The method as claimed in claim 1, wherein the solvent (104) is at least one of distilled water, dimethylformamide (DMF) and N-methyl-2-pyrrolidone (NMP).

6. The method as claimed in claim 1, wherein the processing of bonded activated carbon (112) comprises:

reducing the bonded activated carbon (112) into smaller particles using a crusher system; and processing the smaller particles to one or more-micron levels.

7. The method as claimed in claim 6, wherein the bonded activated carbon (112) is reduced to one or more-micron levels ranging from 10 to 45 microns.

8. The method as claimed in claim 1, wherein the battery electrode is used in at least one of lead acid batteries, sodium-ion batteries, lithium-ion batteries, or other electrochemical cells.

* * * * *